United States Patent
Heinsey et al.

(10) Patent No.: US 7,022,012 B2
(45) Date of Patent: Apr. 4, 2006

(54) SENSITIVITY ADJUSTMENT FOR STONE DETECTION SYSTEM

(75) Inventors: David N. Heinsey, Stevens, PA (US); Michael J. Digman, Denver, PA (US); Steven C. Young, Lancaster, PA (US)

(73) Assignee: CNH America LLC, Racine, WI (US)

(*) Notice: Subject to any disclaimer, the term of this patent is extended or adjusted under 35 U.S.C. 154(b) by 0 days.

(21) Appl. No.: 10/933,024

(22) Filed: Sep. 2, 2004

(65) Prior Publication Data

US 2006/0042211 A1    Mar. 2, 2006

(51) Int. Cl.
   A01D 75/18    (2006.01)
   A01F 12/16    (2006.01)
   A01F 21/00    (2006.01)

(52) U.S. Cl. .......................................... 460/2

(58) Field of Classification Search .............. 460/1, 460/2, 3, 4, 5, 6; 56/10.2 R, 10.2 E, 10.2 G, 56/DIG. 15; 340/684, 459, 438; 701/48, 701/50
See application file for complete search history.

(56) References Cited

U.S. PATENT DOCUMENTS

| | | | |
|---|---|---|---|
| 3,722,193 A | 3/1973 | Strubbe | |
| 4,136,508 A | 1/1979 | Coleman et al. | |
| 4,259,829 A | 4/1981 | Strubbe | |
| 4,275,546 A | 6/1981 | Bohman et al. | |
| 4,294,062 A | 10/1981 | Seymour | |
| 4,296,409 A | 10/1981 | Whitaker et al. | |
| 4,322,933 A * | 4/1982 | Seymour | 460/2 |
| 4,343,137 A * | 8/1982 | Seymour | 460/3 |
| 4,353,199 A * | 10/1982 | Chow et al. | 460/2 |
| 4,376,298 A | 3/1983 | Sokol et al. | |
| 4,467,819 A | 8/1984 | Musser et al. | |
| 5,070,682 A * | 12/1991 | Bohman | 56/10.2 J |
| 5,901,535 A | 5/1999 | Duckinghaus et al. | |
| 5,978,720 A | 11/1999 | Hieronymus et al. | |
| 6,116,008 A | 9/2000 | Digman et al. | |
| 6,167,337 A * | 12/2000 | Haack et al. | 701/50 |
| 6,269,618 B1 * | 8/2001 | Digman et al. | 56/10.2 J |
| 6,298,641 B1 | 10/2001 | Digman et al. | |
| 6,324,822 B1 * | 12/2001 | Oliva | 56/10.2 J |
| 6,397,571 B1 | 6/2002 | Ehrecke | |
| 6,513,311 B1 | 2/2003 | Berger et al. | |
| 6,519,923 B1 | 2/2003 | Cooksey et al. | |
| 6,591,591 B1 | 7/2003 | Coers et al. | |
| 6,592,453 B1 | 7/2003 | Coers et al. | |
| 6,601,372 B1 | 8/2003 | Heinsey et al. | |
| 6,637,179 B1 | 10/2003 | Duncan | |
| 2003/0019196 A1 | 1/2003 | Coers et al. | |
| 2003/0115846 A1 | 6/2003 | Duncan | |
| 2004/0006958 A1 | 1/2004 | Thiemann et al. | |

* cited by examiner

Primary Examiner—Árpád Fábián Kovács
(74) Attorney, Agent, or Firm—Rebecca Henkel

(57) ABSTRACT

A stone detection system of a harvester that automatically changes its sensitivity to signals from a stone sensor in response to the type of harvesting equipment connected to the harvester is provided. The stone detection system generally includes a stone sensor, a header sensor and a microprocessor. The stone sensor is configured to generate a signal indicative of the presence of a stone in the crop harvesting system. The header sensor is disposed on the crop harvesting system to sense the header type and to generate a signal indicating the header type. The microprocessor is coupled to the stone sensor and the header sensor to process the stone sensor signal based at least in part upon the header sensor signal.

24 Claims, 3 Drawing Sheets

SENSITIVITY ADJUSTMENT FOR STONE DETECTION SYSTEM

FIELD OF THE INVENTION

The invention relates generally to harvester vehicles. More particularly, it relates to control systems and monitoring systems for harvester vehicles. Even more particularly, it relates to systems for monitoring harvesters for error conditions such as the presence of stones.

BACKGROUND OF THE INVENTION

Combined harvesters, thrashers and crop cleaners, also known as "combines" or "harvesters", cut crop material close to the ground, gather it together, and thrash it, removing unwanted plant matter and dirt from the grains and seeds (the crop) to be harvested. Harvesters have two primary stages: the first stage (called the "crop delivery system" herein includes a header and a feeder.

The header portion of a harvester extends along the ground, engages the stalks of growing plants with a comb-like cutter bar, cuts the plants off very close to the ground, and presents the cut off plant material to the feeder. The feeder portion gathers the cut off plant material, compresses it slightly, and feeds it to the thrashing portion of the harvester.

Feeders typically include a conveyor that extends from the header portion to the thrashing portion of the harvester. This conveyor engages the mat of plant material and draws it upward from ground level to perhaps four feet above the ground where it presents the plant matter to the mouth of the thrashing section.

The thrashing section of a harvester typically includes one or two pairs of concentric cylinders that rotate with respect to each other, shredding the plant material, thereby dislodging the crop from the remaining unwanted stalks and leaves.

To thrash the plant matter effectively, the spacing of the concentric cylinders is critical. The gap between the two cylinders must be narrow enough to separate out the plant matter from the crop (i.e. the grain or seed), yet not so narrow that the thrashing elements damage the crop. In many cases, the space between the two cylinders can be as small as 1 or 2 inches, and cannot be permitted to vary more than an inch or so as the concentric cylinders rotate with respect to one another.

If the gap between the two cylinders varies over time, and becomes either wider or narrower, the harvester will cease to harvest the crop well. If the gap increases, the thrashing section will no longer separate the crop from the plant matter and the entire mass will be passed through the thrashing section, to other components expecting clean crop from the harvester. If the gap decreases, the two cylinders will not only separate the plant matter from the crop, they will actually damage the individual kernels of the crop itself thus producing a much lower quality crop.

One of the significant problems for harvesters is preventing other material such as stones from entering the crop delivery system than being fed into the thrashing section. Agricultural fields are quite commonly strewn with such objects as stones. The cutter bar of the crop delivery system is usually positioned quite closely to the ground, within one or two inches of the ground for some crops. At this height, even small stones are easily scooped up into the header section and fed along with the plant material into the feeder and thrashing sections.

Once a stone enters the thrashing section, even a small rock about two or three inches across, it can do serious damage to the thrashing section. Forced between the two cylinders the stone obstructs the passage of small ribs or fins disposed on the mating surfaces of the two concentric cylinders that separate the crop from the stalks and leaves. If the rock is large enough, it can actually jam the two cylinders, prevent them from rotating with respect to each other, and shut down the harvester. Harvesting can be delayed for several hours as the farmer works to remove the stone.

One means of protecting a harvester from stones was described in U.S. Pat. No. 6,601,372, which issued to the assignee of the present patent application. In this patent, a system for dealing with stones drawn into the crop delivery system is provided. A stone sensor such as a piezoelectric transducer is mounted in the crop delivery system to sense impacts of rocks as they are swept into the header and feeder. A microprocessor is coupled to the sensor, monitoring the signals from the sensor and determining whether a rock has entered the crop delivery system. When the signals reach a predetermined level, the microprocessor signals the operator in the cabin and signals a solenoid in a hard object removal system mounted to the bottom of the feeder. When the solenoid receives the signal from the microprocessor, it opens a door in a hard object removal system and permits the rock or other hard object that triggered the piezoelectric sensor to fall out and onto the ground.

The sensitivity of the system should be varied according to the type of crop that is being harvested. For some crops, such as soybeans, wheat, and rice, the crop and plant matter that is carried into the harvester together with the crop is soft, pliable, thin, and generates relatively little noise. In contrast to this, crops such as corn, for example, generate a lot of noise when they are drawn into the crop delivery system of the harvester. Corn plants have stalks as well as ears. The stalks are stiff and thick and the ears are hard. When the header cuts the corn plants and they fall into the header, the ears and the stalks cause a considerable amount of noise. As the ears and stalks impact the sides and bottom of the crop delivery system, they cause the piezoelectric sensor to generate sharp and loud signals similar to the signals generated by stones.

Unless the sensitivity of the stone detection system is adjusted appropriately, the microprocessor can easily confuse crop signals generated by noisy crops with signals generated by stones. For this reason, whenever the operator changes from one crop to another crop by changing the type of header used on the harvester, he should change the sensitivity of the stone detection system of the '372 patent. Not all farmers do this, however. Further, the farmers that adjust the sensitivity may not adjust it correctly. What is needed, therefore, is a system for automatically changing the sensitivity of the stone detection system based upon the type of crop that is being harvested. It is an object of this invention to provide such a system.

A wide variety of crops can be harvested by a single harvester. The chassis and thrashing elements of the harvester are typically adjustable to permitted to harvest everything from wheat to rice to soybeans to corn. No one single header can be used with all of these crops, however. For that reason, headers are made to be interchangeable. A header for one crop can be unbolted and removed from the feeder and another header for another crop attached in its place. Some of the more common headers include corn headers, grain headers, and Draper headers. Corn headers, as one might expect, are intended for harvesting corn. Grain and Draper headers are designed to harvest grass crops such as rice, wheat, and oats. These are the most common headers used on harvesters. Different headers for other specialty crops are also known and used, but in lesser numbers.

Whenever a harvester is operated with a corn header, the only crop it harvests is corn. Similarly, whenever a harvester is operated with a grain header or Draper header the only crop it harvests is a grass crop. What the applicants have devised is a system for automatically determining the type of header attached to the harvester in using that information to automatically set the sensitivity of the stone protection system at a level appropriate for that crop. By automatically sensing the type of header attached to the harvester, and automatically adjusting the stone detection system's sensitivity to stone sensor signals, the farmer is automatically assisted in selecting the appropriate sensitivity.

SUMMARY OF THE INVENTION

In accordance with a first aspect of the invention, a method is provided for automatically configuring a stone detection system in a harvester having a harvester chassis coupled to a crop harvesting system, the crop harvesting system including a header and a feeder, the method including the steps of (1) reading a signal generated by the crop harvesting system that indicates the type of crop harvesting system, and (2) appropriately adjusting the sensitivity of a stone detection system.

The crop harvesting system may include a corn header, a Draper header, or a grain header. The crop harvesting system may include a signaling device configured to generate a signal indicative of the type of crop harvesting system. The crop harvesting system may include a signaling device configured to generate a signal indicative of the type of header. The signaling device may include a switch, a precision resistor, a voltage divider, and RFID tag, a microprocessor, or a switch-engaging member. The harvester chassis may include an electronic controller configured to process a stone sensor signal. The stone sensor signal may be a piezoelectric sensor signal. The electronic controller may be configured to sense at least two different types of crop harvesting systems and to select different sensitivities for each of the different crop harvesting systems. The signaling device may be mounted on the header. The signaling device may automatically engage a coupling on the feeder. The coupling on the feeder may transmit a signal to the microprocessor indicating the type of header to which it is coupled.

In accordance with a second aspect of the invention, a stone detection system for a harvester is provided, the harvester having a harvester chassis coupled to a crop harvesting system, and the crop harvesting system including a header and a feeder, wherein the system includes a stone sensor configured to sense the presence of a stone in the crop harvesting system, a header sensor configured to sense the type of header coupled to the harvester feeder, and a microprocessor coupled to the stone sensor and the header sensor to (1) read a signal from the indicating the type of crop harvesting system from the header sensor, and (2) change its sensitivity to the stone sensor signal based upon the signal indicating the type of crop harvesting system.

In accordance with a third aspect of the invention, a harvester is provided including a harvester chassis; a crop harvesting system, the crop harvesting system including a header and a feeder; a stone sensor fixed to the crop harvesting system; a header sensor configured to generate a signal indicative of the header's type; and an electronic controller coupled to the stone sensor and the header sensor; wherein the electronic controller is configured to generate a signal indicative of the presence of the stone in the crop harvesting system based upon signals from the stone sensor, and further wherein the electronic controller is configured to change its sensitivity to the stone sensor signal based upon the signal indicative of the header's type.

In accordance with a fourth aspect of the invention, an electronic stone detection system for a harvester is provided, the harvester including a self-propelled vehicle coupled to a crop harvesting system, the crop harvesting system including a header having a type, and a feeder, the system comprising: a stone sensor configured to generate a signal indicative of the presence of a stone in the crop harvesting system; a header sensor disposed on the crop harvesting system to sense the header type and to generate a signal indicating the header type; and a microprocessor coupled to the stone sensor and the header sensor to process the stone sensor signal based at least in part upon the header sensor signal.

The microprocessor may be configured to change a sensitivity of an electronic filter, an amplifier or an electronic comparator based at least in part upon the header sensor signal. The stone sensor may include a piezoelectric transducer. The header sensor may be removably coupled to the header. The microprocessor may be configured to provide a different sensitivity when it is coupled to a corn header than when it is coupled to a grain header. The microprocessor may be configured to increase sensitivity by lowering a comparator threshold and to decrease sensitivity by increasing a comparator threshold. The microprocessor may be configured to increase sensitivity by widening a pass band and to decrease sensitivity by narrowing a pass band. The microprocessor may be configured to increase sensitivity by increasing an amplification and to decrease sensitivity by decreasing an amplification.

In accordance with a fifth aspect of the invention, a harvester having an electronic stone detection system is provided, including: a self-propelled vehicle including a threshing mechanism; a crop harvesting system coupled to the vehicle, the crop harvesting system further comprising, a header having a type, and a feeder; a stone sensor configured to generate a signal indicative of the presence of a stone in the crop harvesting system; a header sensor disposed on the crop harvesting system to sense the header type and to generate a signal indicating the header type; and a microprocessor coupled to the stone sensor and the header sensor to process the stone sensor signal based at least upon the header sensor signal.

The microprocessor may be configured to change a sensitivity of an electronic filter, an amplifier or an electronic comparator based at least upon the header sensor signal. The stone sensor may include a piezoelectric transducer. The header sensor may be removably coupled to the header. The microprocessor may be configured to have a different sensitivity when coupled to a corn header than when coupled to a grain header. The microprocessor may be configured to increase sensitivity by lowering a signal comparator threshold and to decrease sensitivity by increasing a signal comparator threshold. The microprocessor may be configured to increase sensitivity by widening a signal pass band and to decrease sensitivity by narrowing a signal pass band. The microprocessor may be configured to increase sensitivity by increasing a signal amplification and to decrease sensitivity by decreasing a signal amplification.

In accordance with a sixth aspect of the invention, a computer-implemented method for changing the sensitivity of a stone detection system in a harvester that includes a self-propelled vehicle including a threshing mechanism, a crop harvesting system including a header of a particular type and a feeder, a stone sensor configured to generate a signal indicative of the presence of a stone in the crop harvesting system, and a header sensor disposed on the crop harvesting system to sense the header type and to generate a signal indicating the header type and an electronic circuit coupled to the stone sensor and the header sensor is provided, the method including the steps of: electronically determining the type of a component of the crop harvesting system; and electronically configuring the sensitivity of the circuit to a signal from the stone sensor based upon the step of determining.

The step of electronically configuring may include the step of electronically changing an electronic filter, may include electronically changing an amplifier, or may include electronically changing an electronic comparator based on the step of determining. The signal from the stone sensor may be a piezoelectric signal. The header sensor may be removably coupled to the header. The step of electronically configuring may include the step of reducing the sensitivity of the circuit when the header is a corn header and may include increasing the sensitivity of the circuit when the header is a grain header. The step of electronically configuring may include the step of increasing sensitivity of the circuit by lowering a comparator threshold and may include decreasing sensitivity of the circuit by raising a comparator threshold. The step of electronically configuring may include the step of increasing sensitivity of the circuit by broadening a pass band and may include decreasing sensitivity of the circuit by narrowing a pass band. The step of electronically configuring may include the step of increasing sensitivity of the circuit by increasing an amplification and may include decreasing sensitivity of the circuit by decreasing an amplification.

DETAILED DESCRIPTION OF THE PREFERRED EMBODIMENTS

"Sensitivity" as used herein refers generally to responsiveness to a sensor signal. Consider two stone detection circuits coupled to the same stone sensor. The system that indicates (or that would indicate, if coupled to an indicating device or to a removal device) the presence of stones more often is considered more sensitive. The type of indication will depend, of course, upon the other components to which the circuit is coupled. If coupled to a device that eliminates stones, the stone detection circuit that operates more often is the more sensitive. If the connected to a visual alarm, the system that lights up more often, or lights up brighter, is the more sensitive. If the circuit is coupled to an annunciator, the circuit that makes a louder sound, or a longer sound, or a more piercing sound, is the more sensitive circuit. In sum, the stone detection circuit that indicates longer, louder, brighter, shriller, more often, at a higher frequency, or at a higher pitch, or in any other way indicates that the stone problem is worse than indicated by the other circuit (when provided with the same sensor signal), is "more sensitive" than the other stone detection circuit.

Harvester Operation

Figure 1:
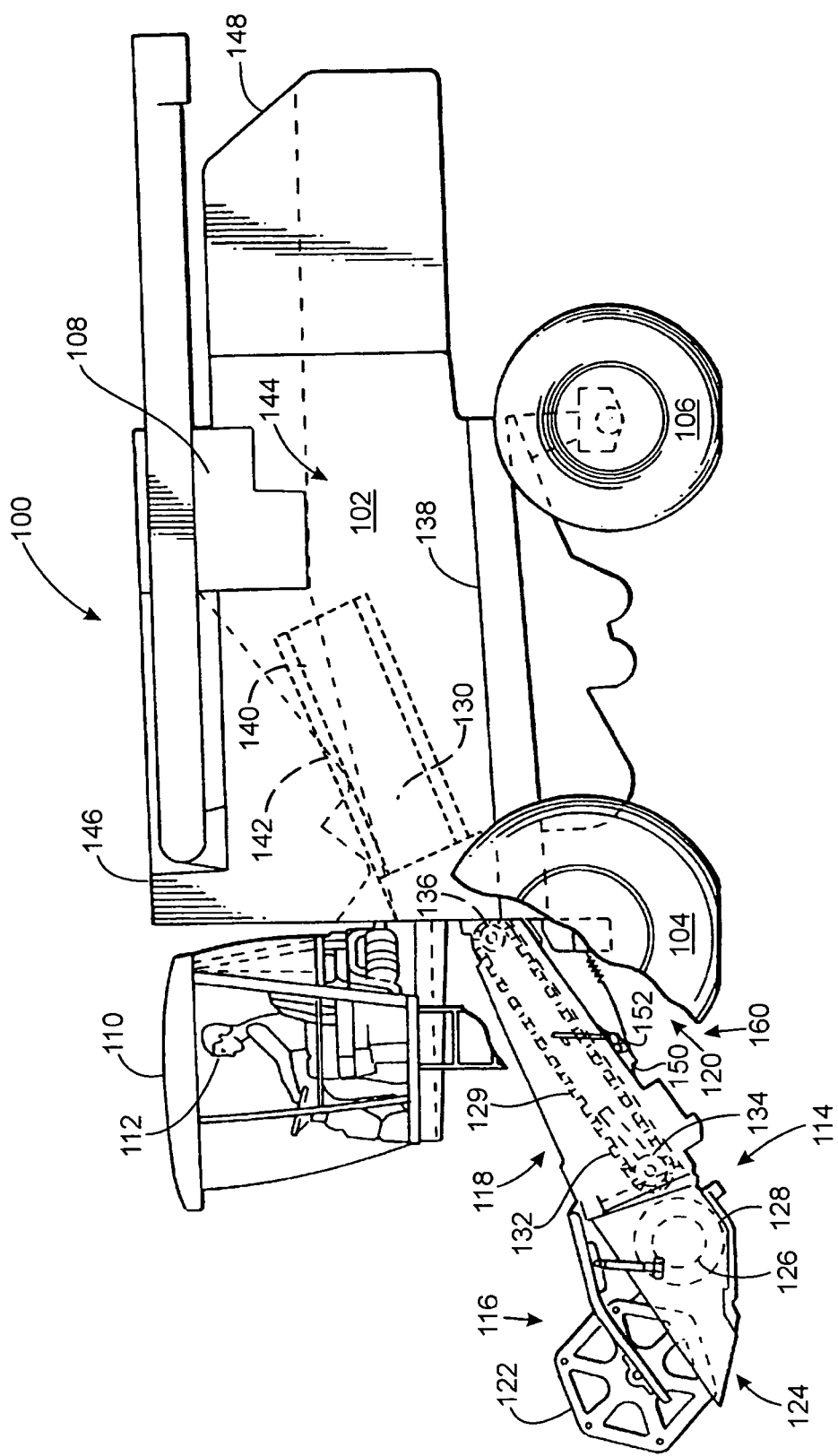
FIG. 1 illustrates a stone detection system for or a harvester in accordance with the present invention.

Referring to FIG. 1, a harvester 100 includes a self-propelled vehicle 102 with two pairs of wheels 104, 106, an engine 108 mechanically connected to rotate the wheels, and a cab 110 where the vehicle operator 112 sits. Harvester 100 also includes a crop harvesting system 114 coupled to the front of the self-propelled vehicle 102. The crop harvesting system 114 further includes a header 116 coupled to a feeder 118, that is in turn coupled to the front 120 of the self-propelled vehicle 102.

Header 116 includes a reel assembly 122 for pulling crops into the header 116 so that the crops are cut by a blade assembly 124 in the conventional manner. Blade assembly 124, also known as a "cutter bar", may be rigid or flexible. Header 116 also includes an auger 126 that is disposed in an auger trough 128. The trough and the auger extend laterally across the width of the header. They are positioned to gather all crop matter that is cut by the blade assembly 124 as it falls backward into the header.

Auger 126 draws the crop matter from the left and right ends of the header into a central portion approximately four to six feet wide. Once the auger has drawn the plant matter from both ends towards the center of the header, it pushes the plant matter into feeder 118. Feeder 118 includes an elevator 129 that extends across the width of the feeder and draws plant matter into the threshing mechanism 130 of vehicle 102. Elevator 129 includes a metal belt 132 that is wrapped around a front drum 134 and rear drum 136. The front drum 134 extends laterally across the forward portion of the feeder adjacent to the auger. Rear drum 136 extends laterally across the rear portion of the feeder adjacent to the mouth of threshing mechanism 130. The feeder 118 (or "feed house" as it is also known) serves to draw material from auger 126 to the inlet of threshing mechanism 130. The feeder also serves to support the header itself and to position the header in front of vehicle 102, slightly above the ground.

Self-propelled vehicle 102 has a chassis 138 that supports threshing mechanism 130. Mechanism 130 includes two nested, concentric threshing cylinders 140, 142. Cylinder 140 is slightly smaller than cylinder 142 and is disposed inside cylinder 142. Both cylinders are mechanically and hydraulically coupled (not shown) to engine 108 which drives them in rotation. Cylinders 140, 142 rotate at different speeds. The difference in speeds between them provides the mechanical action necessary to thresh the crop matter brought to them by elevator 129. The facing surfaces of cylinders 140, 142 are equipped with protrusions such as fins or vanes (not shown). These protrusions engage the crop matter from passing between the two cylinders and separate the stalks and leaves from the crop itself. This process is called "threshing" or "thrashing".

Crop matter enters the front end of threshing mechanism 130, is threshed as it passes through the mechanism, and eventually leaves mechanism 130 at a rear portion thereof. The threshed crop matter then passes into a grain/chaff separation system 144, which separates the crop (the grain) from the chaff or residual plant matter. The crop is then stored in tank 146 and the chaff is discarded by chaff spreader 148.

Stone Detection

As mentioned above, the spacing of the two cylinders that comprise threshing mechanism 130 is critical to the proper operation of the harvester. The spacing between the two cylinders is not sufficient to allow a stone, even a stone as small as two or three inches in diameter to pass through without damaging or jamming threshing mechanism 130. For this reason, stones must be sensed and removed from the crop matter before they reach the inlet of threshing mechanism 130. This sensing is the function of the stone detection system.

The stone detection system includes several interconnected electronic components described in more detail in U.S. Pat. No. 6,601,372, which is incorporated herein by reference for its description of the harvester and its description of the stone detection system. The stone detection system described in the '372 patent differs from the stone detection system described herein only by the addition herein of a header sensor that is coupled to the microprocessor and the new programming of the microprocessor. This new programming configures microprocessor 170 to monitor the header sensor and change the system's sensitivity to signals generated by the stone sensor ("sensor 40" in the '372 patent).

Header 116 is coupled to feeder 118, which transmits the just-cut crop matter from the header to the inlet of threshing mechanism 130 inside vehicle 102. As this crop matter is gathered, it is often mixed with stones that are lying in the field. The stones are scooped up by the blade mechanism as it travels through the field scant inches from the surface of the soil. When stones are brought into the header, they are typically enmeshed with the crop matter and therefore are easily pushed backwards into the auger. The auger then carries the crop matter with stones to the center of the header and pushes the mixture of crop matter and stones into the inlet of elevator 129.

As the drums of elevator 129 rotate, they drag the crop matter and the stones across a bottom surface of feeder 118. As the stones slide and bounce across the surface, their collisions with the surface generate high frequency spikes of noise. These sharp noises are sensed by hard object detector 150 that is fixed to the bottom surface of feeder 118. Hard object detector 150 includes a sensor 152, in the preferred embodiment of piezoelectric stone sensor, which senses the vibrations of the bottom surface of feeder 118.

Stones are hard objects. They do not have a resilient outer surface that can absorb impacts. Crop matter, by comparison, is a resilient material. Since it is resilient, it tends to absorb the high frequency noises that would otherwise be produced when the crop matter hits the lower surface of feeder 118. Not all crop matter is equal, however. In the case of grass crops, such as wheat, rice, and oats (and to a lesser extent, soybeans) the grains that are harvested and the stalks on which they are suspended are extremely soft and pliable. Virtually no stone-like high frequency and high-amplitude noise components are generated when grass crops pass through the feeder and into threshing mechanism 130. Corn, however, is a different proposition. Corn plants have stiff, hard stalks with large diameters and significant lengths as compared to grass crops. Ears of corn are attached to the upper portions of the stalks and fall from a significant height (as compared with grass crops) into header 116. Ears of corn are relatively heavy, large, and have a hard, stone-like outer surface formed by the array of corn kernels fixed to the corncob. When ears of corn are drawn into and through the header and feeder, they roll and tumble, making brief hard impacts with the surfaces of the header and feeder. The noise signals they generate bear a striking similarity to the signals of smaller rocks.

Because of these differences between grass crops and corn crops, a stone detection system for harvester with a grass crop header can be programmed to sense even small stones carried along with grass crop through the feeder. If a stone detection system for a harvester with a corn header is set to the same sensitivity, it typically generates numerous false alarms. The impacts of the corncobs against the surfaces of the feeder and header are interpreted by the stone detection system as sounds made by stones. Thus, it is important to adjust the sensitivity of the stone detection system based upon the type of crop being harvested. For this reason, the electronic circuitry of the stone detection system that is coupled to sensor 152 is configured to adjust its sensitivity in response to the type of crop being harvested. More particularly, it is configured to adjust its sensitivity in response to the type of header attached to the feeder. Since headers are crop-specific, if one knows the header that is attached to the feeder one usually knows the type of crop that is being harvested.

Figure 2:
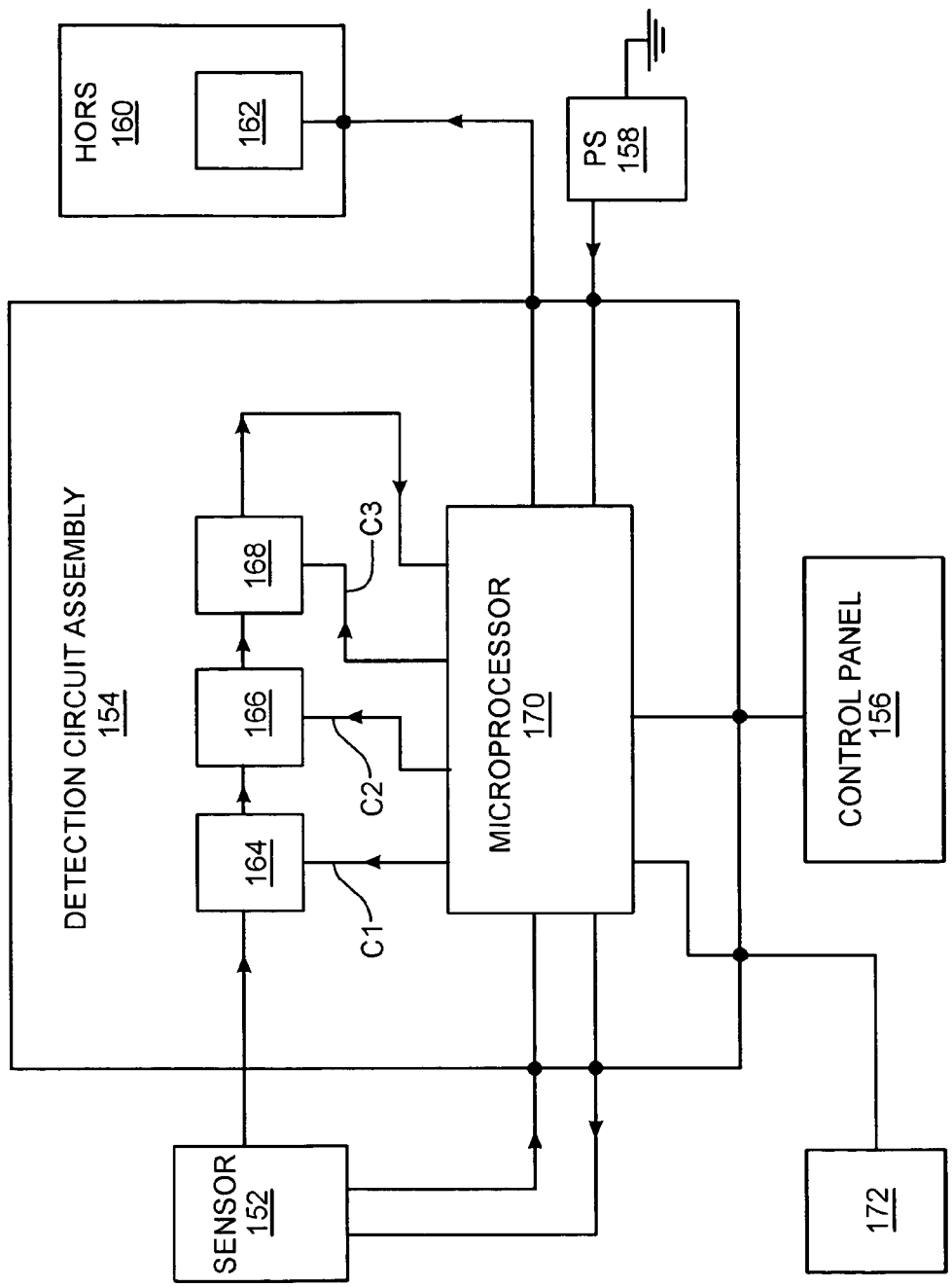
FIG. 2 illustrates the stone detection system in detail, showing the electronic components of the stone detection system and the associated sensors.

FIG. 2 illustrates an automatic sensitivity-adjusting stone detection system that includes stone sensor 152, detection circuit 154, control panel 156, and power supply 158. Stone sensor 152 preferably includes a piezoelectric transducer. The stone detection system is connected to and controls hard object removal system 160, which is fixed to the bottom surface of feeder 118. Hard object removal system 160 includes a gate operated by solenoid 162. When detection circuit 154 determines that a stone is present in the feeder, it signals hard object removal system 160 by driving solenoid 162 and opening a hatch on the bottom of feeder 118. Stones that have entered feeder 118 then drop through this open hatch and onto the ground. Detection circuit 154 includes a programmable amplifier 164, band-pass filter 166, programmable comparator 168, microprocessor 170, and header sensor 172. The interoperation of these components (with the exception of the header sensor) are described in the '372 patent.

In addition to its monitoring of sensor 152 and generating signals indicating the presence of the stone, microprocessor 170 is programmed to modify the response of preamplifier 164, bandpass filter 166, and programmable comparator 168, based upon the type of header attached to vehicle 102. To do this, microprocessor 170 is programmed to read header sensor 172. The header sensor 172 is coupled to feeder 118, and is configured to sense the presence and the type of header 116 when header 116 is attached to feeder 118. Header sensor 172 generates a signal indicating a type or characteristic of header 118 when it is mounted on vehicle 102. The type or characteristic of the header may be sensed in many ways. For example, the header sensor 172 may include a sensor responsive to protrusions on the header, such as small switches. Header sensor 172 may include a radio receiver configured to respond to a transmitter on the header, such as an RFID tag. Header sensor 172 may include an optical sensor that senses light emitted by the header or senses the interruption of light by the header. Header sensor 172 may include a proximity sensor that is responsive to the presence of the header or the materials from which it is made. Header sensor 172 may include a magnetic sensor configured to respond to the presence or absence of portions of the header in a magnetic field. Header sensor 172 may sense electrical signals generated by the header when the header is connected to the feeder. Header sensor 172 may provide power to electrical components on the header that, in turn, generate a signal that is transmitted to back to microprocessor 170.

In any of the foregoing configurations of header sensor 172, the sensor transmits a signal indicative of the type or characteristic of header attached to vehicle 102. This signal is transmitted to microprocessor 170, which reads this signal and changes the sensitivity of detection circuit 154 in response thereto.

In a preferred embodiment of the stone detection system (see FIG. 1), header sensor 172 includes an electrical connector block 174 with several electrical connections that are electrically coupled to a mating connector block 176 on the header whenever the header and feeder are fixed together. If header 116 is a corn header, it generates one type of signal on its connector block 176. If header 116 is a grain header or Draper header, it generates another type of signal on its connector block 176. Electrical connector block 174 on feeder 118 engages electrical connector block 176 and transmits these signals to microprocessor 170.

A header sensor arrangement such as this preferred embodiment can be found in the U.S. Pat. No. 6,519,923 which is owned by the assignee of the present application and is incorporated herein by reference for all that it teaches regarding the mechanical and electrical connections between the header and the feeder, the way in which signals are generated indicating the type of header, and the way in which the signals are transmitted back to the electronic control unit (in the present case, the microprocessor 170).

As explained above, corn is a particularly noisy crop. Thus, whenever a corn header is attached to vehicle 102 in place of the grain crop header, the sensitivity of the stone detection system must be reduced. When microprocessor 170 senses a signal from header sensor 172 indicating that header 118 is a corn header, it programs programmable amplifier 164 over signal line C1 to reduce the amplification of the signal arriving from sensor 152. Microprocessor 170 also programs band-pass filter 166 over signal line C2 to narrow its pass band. Microprocessor 170 also programs programmable comparator 168 over signal line C3 to increase its threshold.

In alternative embodiments, and based upon the type of header coupled to vehicle 102, how susceptible the header is to gathering stones, the strength of threshing mechanism 130, it's ability to tolerate the stones, and the resilience of the bottom surface of feeder 118, among other factors, microprocessor 170 may alternatively program any one, two, or three of the programmable amplifier 164, the band-pass filter 166, and the programmable comparator 168 in any combination that is sufficient to reduce the sensitivity of the system.

Whenever the sensitivity of the stone detection system is reduced, more stones are passed through feeder 118 and into threshing mechanism 130. This is almost inevitable whenever the system's sensitivity is reduced. By reducing the amplification of the signal by narrowing the pass band of the filter and by increasing the threshold of the comparator, the system not only ignores noises made by "noisy" crops like corn, it also ignores noises made by small stones. Without this decreased sensitivity, however, whenever a corncob makes a particularly hard impact against the bottom of feeder 118, the operator would be notified that a stone had been received and rejected by hard object removal system 160. Erroneous signals from the system indicating that stones are being swept into the header can lead a farmer to raise the header to avoid the stones or to stop and readjust the harvester.

Figure 3:
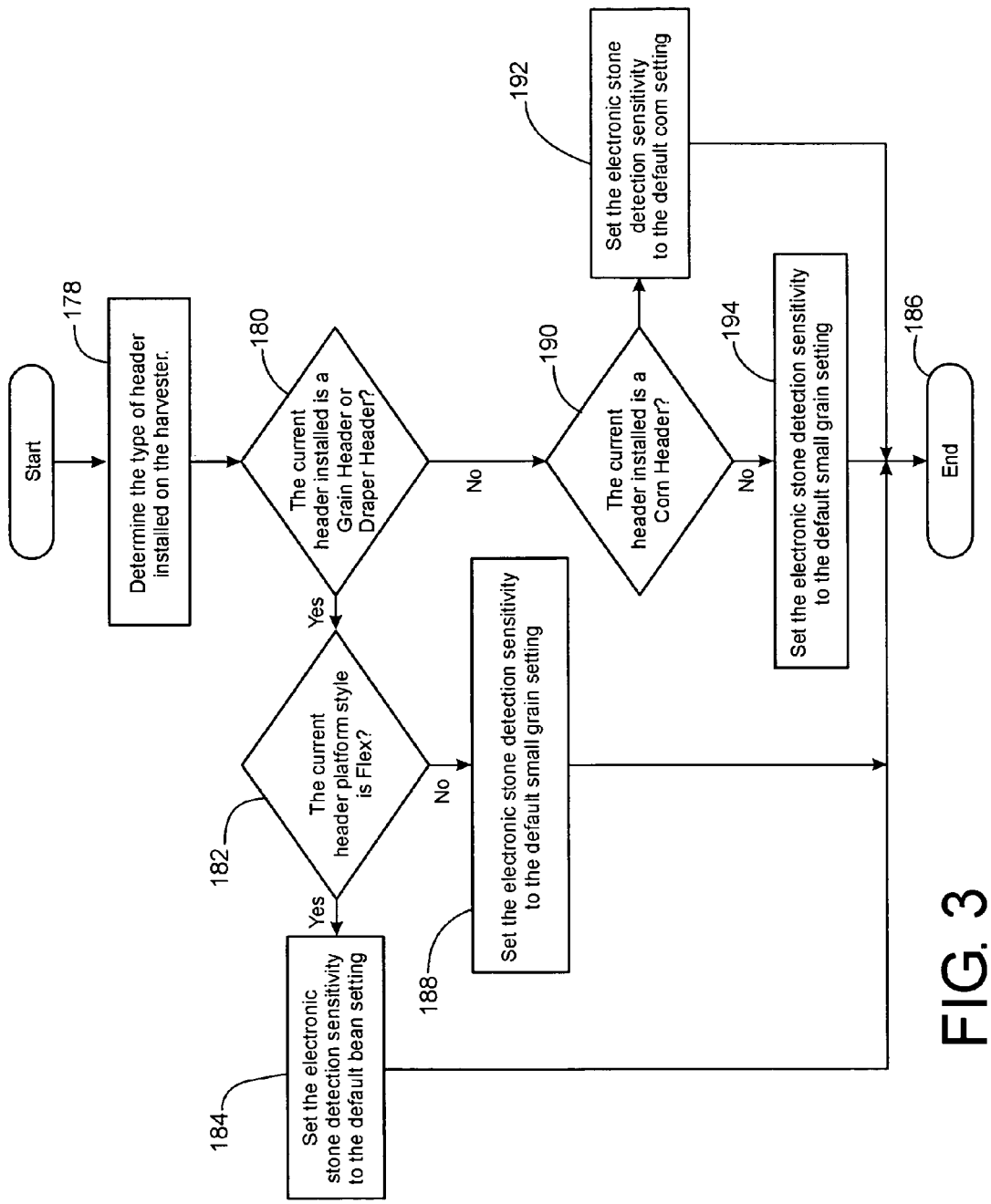
FIG. 3 is a flow chart of the programmed operation of the stone detection system showing how the stone detection system senses the type of crop harvesting system (e.g. header) and configures the proper sensitivity of the stone detection system.

FIG. 3 illustrates a preferred process for changing the sensitivity of detection circuit 154. FIG. 3 illustrates the steps performed by microprocessor 170 on the initial startup of the harvester. When the harvester is initially started, and microprocessor 170 is energized, it performs step 178 in which it determines the type of header that is installed on the harvester. In this step, microprocessor 170 reads the signals generated by header sensor 172 that indicate the type of header attached to the harvester. In step 180, microprocessor 170 examines the signals received from header sensor 172 and compares them with predetermined signals stored in the non-volatile memory of microprocessor 170.

If this comparison shows that the attached header is a grain header or Draper header (i.e. is of the grain header type or the Draper header type), microprocessor 170 proceeds to step 182. In step 182, microprocessor 170 determines whether the current header or platform style is Flex. A header with a "Flex platform" uses a blade assembly 124 that is flexible. These flexible blade assemblies 124 are used when harvesting soybeans. They flex to follow the contours of the ground closely. This close following of the ground is beneficial when harvesting soybeans. Microprocessor 170 determines whether the header has a Flex platform by reading a switch on control panel 156. Control panel 156 is in the operator's compartment. The switch in the control panel is set by the operator of the vehicle.

If microprocessor 170 determines that the current header or platform type is Flex, it then proceeds to step 184 in which it sets the sensitivity of the stone detection system to the default setting for soybeans. The default sensitivity settings for headers harvesting soybeans are stored in the non-volatile memory of microprocessor 170. Once microprocessor 170 has set the sensitivity of the stone detection system, the sensitivity-setting process proceeds to step 186 where it ends.

Once the system is calibrated by setting the sensitivity, microprocessor 170 does not stop working. Instead, microprocessor 170 continues its regular functions of monitoring sensor 152 and controlling the hard object removal system 160 as described in U.S. Pat. No. 6,601,372.

Of course, microprocessor 170 may determine in step 182 that the current header or platform type is not Flex. Flex platform headers are used to harvest soybeans. If the platform is not Flex, then microprocessor 170 proceeds to step 188 in which it sets the stone detection system's sensitivity to the default setting for small grain such as wheat, rice, or oats, which are typically harvested with a grain or Draper header but not a Flex platform. The default small grain sensitivity settings are stored in the non-volatile memory of microprocessor 170.

If microprocessor 170 determines in step 180 that the current header is not a grain header or Draper header, it proceeds to step 190 in which it checks to see whether the current header is a corn header (i.e. of the corn header type) or not. If the current header is a corn header, microprocessor 170 continues to step 192 in which it sets the sensitivity to the default corn setting. The default sensitivity settings for corn headers are stored in the non-volatile memory of microprocessor 170.

On the other hand, if microprocessor 170 determines in step 190 that the current installed header is not a corn header, it then proceeds to step 194 and sets the stone detection system's sensitivity to the default setting for small grain.

After setting the sensitivity of the system in either of steps 192 or 194, microprocessor 170 proceeds to step 186 where it ends.

As the appreciated by one skilled in the art, the sequences of steps seen this method for changing the sensitivity of the stone detection system is not limited to the particular listed sequence of steps. Furthermore, the sensitivity of the system can be varied by other means than the steps of filtering and comparing described above. Numerous changes can be made without departing from the scope and spirit of the method and apparatus described herein.

While the present invention has been described with reference to certain preferred embodiments, one of ordinary skill in the art will recognize that additions, deletions, substitutions, modifications and improvements can be made while remaining within the spirit and scope of the present invention as defined by the appended claims. For example, other sensors may be used them the piezoelectric sensor disclosed here. If a corn header is made much stiffer than the common corn headers presently in use, it may be that the sensitivity of the stone detection system must actually be increased when a corn header is attached. This is distinctly possible, since headers may be made of dissimilar materials and each may be provided with its own stone sensor. In the description of the stone detection system above, a microprocessor was illustrated configuring a filter, a comparator, and an amplifier. While these devices are shown as separate and independent from the microprocessor herein, microprocessor 170 may have its own internal filter, amplifier, and comparator that are implemented in the programming or digital logic of the microprocessor. In other words, adjusting the sensitivity of the circuit may mean changing parameters maintained and used completely internally to the microprocessor. In a case such as this, the sensor signals would be digitized using an analog-to-digital converter and all further signal processing would occur inside microprocessor 170 with the signals represented in digital form.

The invention claimed is:

1. An electronic stone detection system for a harvester, the harvester including a self-propelled vehicle coupled to a crop harvesting system, the crop harvesting system including a header having a type, and a feeder, the stone detection system comprising:
a stone sensor configured to generate a signal indicative of the presence of a stone in the crop harvesting system;
a header sensor disposed on the crop harvesting system to sense the header type and to generate a signal indicating the header type; and
a microprocessor coupled to the stone sensor and the header sensor to process the stone sensor signal based at least in part upon the header sensor signal.

2. The system of claim 1, wherein the microprocessor is configured to change a sensitivity of an electronic filter, an amplifier or an electronic comparator based at least in part upon the header sensor signal.

3. The system of claim 2, wherein the stone sensor includes a piezoelectric transducer.

4. The system of claim 3, wherein the header sensor is removably coupled to the header.

5. The system of claim 4, wherein the microprocessor is configured to provide a different sensitivity when it is coupled to a corn header than when it is coupled to a grain header.

6. An electronic stone detection system for a harvester, the harvester including a self-propelled vehicle coupled to a crop harvesting system, the crop harvesting system including a header having a type, and a feeder, the stone detection system comprising:
a stone sensor configured to generate a signal indicative of the presence of a stone in the crop harvesting system;
a header sensor disposed on the crop harvesting system to sense the header type and to generate a signal indicating the header type; and
a microprocessor coupled to the stone sensor and the header sensor to process the stone sensor signal based at least in part upon the header sensor signal, wherein the microprocessor is configured to increase sensitivity by lowering a comparator threshold and to decrease sensitivity by increasing a comparator threshold.

7. The system of claim 5, wherein the microprocessor is configured to increase sensitivity by widening a pass band and to decrease sensitivity by narrowing a pass band.

8. The system of claim 5, wherein the microprocessor is configured to increase sensitivity by increasing an amplification and to decrease sensitivity by decreasing an amplification.

9. A harvester having an electronic stone detection system, comprising:
a self-propelled vehicle including a threshing mechanism;
a crop harvesting system coupled to the vehicle, the crop harvesting system further comprising,
a header having a type, and
a feeder;
a stone sensor configured to generate a signal indicative of the presence of a stone in the crop harvesting system;
a header sensor disposed on the crop harvesting system to sense the header type and to generate a signal indicating the header type; and
a microprocessor coupled to the stone sensor and the header sensor to process the stone sensor signal based at least upon the header sensor signal.

10. The harvester of claim 9, wherein the microprocessor is configured to change a sensitivity of an electronic filter, an amplifier or an electronic comparator based at least upon the header sensor signal.

11. The harvester of claim 10, wherein the stone sensor includes a piezoelectric transducer.

12. The harvester of claim 11, wherein the header sensor is removably coupled to the header.

13. The harvester of claim 12, wherein the microprocessor is configured to have a different sensitivity when coupled to a corn header than when coupled to a grain header.

14. The harvester of claim 13, wherein the microprocessor is configured to increase sensitivity by lowering a signal comparator threshold and to decrease sensitivity by increasing a signal comparator threshold.

15. The harvester of claim 13, wherein the microprocessor is configured to increase sensitivity by widening a signal pass band and to decrease sensitivity by narrowing a signal pass band.

16. The harvester of claim 13, wherein the microprocessor is configured to increase sensitivity by increasing a signal amplification and to decrease sensitivity by decreasing a signal amplification.

17. A computer-implemented method for changing the sensitivity of a stone detection system in a harvester that includes a self-propelled vehicle including a threshing mechanism, a crop harvesting system including a header of a particular type and a feeder, a stone sensor configured to generate a signal indicative of the presence of a stone in the crop harvesting system, and a header sensor disposed on the crop harvesting system to sense the header type and to generate a signal indicating the header type and an electronic circuit coupled to the stone sensor and the header sensor, the method comprising the steps of:
electronically determining the type of a component of the crop harvesting system; and electronically configuring the sensitivity of the circuit to a signal from the stone sensor based upon the step of determining.

18. The method of claim 17, wherein the step of electronically configuring includes the step of electronically changing an electronic filter, electronically changing an amplifier or electronically changing an electronic comparator based on the step of determining.

19. The method of claim 18, wherein the signal from the stone sensor is a piezoelectric signal.

20. The method of claim 19, wherein the header sensor is removably coupled to the header.

21. The method of claim 20, wherein the step of electronically configuring includes the step of reducing the sensitivity of the circuit when the header is a corn header and increasing the sensitivity of the circuit when the header is a grain header.

22. The method of claim 20, wherein the step of electronically configuring includes the step of increasing sensitivity of the circuit by lowering a comparator threshold and decreasing sensitivity of the circuit by raising a comparator threshold.

23. The method of claim 20, wherein the step of electronically configuring includes the step of increasing sensitivity of the circuit by broadening a pass band and decreasing sensitivity of the circuit by narrowing a pass band.

24. The method of claim 20, wherein the step of electronically configuring includes the step of increasing sensitivity of the circuit by increasing an amplification and decreasing sensitivity of the circuit by decreasing an amplification.

* * * * *